United States Patent
Damnjanovic et al.

(10) Patent No.: US 9,357,510 B2
(45) Date of Patent: May 31, 2016

(54) POWER SHARING AND POWER HEADROOM REPORTING IN DUAL CONNECTIVITY SCENARIOS

(71) Applicant: QUALCOMM Incorporated, San Diego, CA (US)

(72) Inventors: Jelena Damnjanovic, Del Mar, CA (US); Wanshi Chen, San Diego, CA (US); Aleksandar Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/671,364

(22) Filed: Mar. 27, 2015

(65) Prior Publication Data

US 2015/0282104 A1    Oct. 1, 2015

Related U.S. Application Data

(60) Provisional application No. 61/973,126, filed on Mar. 31, 2014.

(51) Int. Cl.
*H04W 76/04* (2009.01)
*H04W 52/36* (2009.01)
(Continued)

(52) U.S. Cl.
CPC .......... *H04W 52/365* (2013.01); *H04W 52/146* (2013.01); *H04W 52/32* (2013.01);
(Continued)

(58) Field of Classification Search
CPC ... H04W 52/146; H04W 52/32; H04W 52/34; H04W 52/365; H04W 52/367; H04W 52/38; H04W 72/0413; H04W 72/0446; H04W 76/046; H04W 88/12

USPC .......... 455/522, 69, 450, 452.1, 9, 10, 13.4, 455/512, 502, 67.11, 67.13, 67.16, 220; 370/330, 329, 328, 311, 294, 295, 252
See application file for complete search history.

(56) References Cited

U.S. PATENT DOCUMENTS

| 9,173,178 B2 * | 10/2015 | Chakraborty | ....... H04W 52/365 |
| 2007/0178930 A1 * | 8/2007 | Xiao | ............. H04W 52/346 455/522 |

(Continued)

FOREIGN PATENT DOCUMENTS

| EP | 2528371 A1 | 11/2012 |
| WO | WO-2014109687 A1 | 7/2014 |

OTHER PUBLICATIONS

International Search Report and Written Opinion—PCT/US2015/023202—ISA/EPO—Jun. 2, 2015.

*Primary Examiner* — Tan H Trinh
(74) *Attorney, Agent, or Firm* — Patterson & Sheridan, LLP

(57) ABSTRACT

Certain aspects of the present disclosure provide procedures for power sharing, scaling, and power headroom reporting in dual connectivity operations. According to certain aspects, a method of wireless communication by a user equipment (UE) is provided. The method generally includes determining a maximum available transmit power of the UE, semi-statically configuring a first minimum guaranteed power available for uplink transmission to a first base station and a second minimum guaranteed power available for uplink transmission to a second base station, and dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

26 Claims, 16 Drawing Sheets

(51) Int. Cl.
*H04W 52/32* (2009.01)
*H04W 72/04* (2009.01)
*H04W 52/14* (2009.01)
*H04W 52/34* (2009.01)
*H04W 52/38* (2009.01)
*H04W 88/12* (2009.01)

(52) U.S. Cl.
CPC ............ *H04W 52/34* (2013.01); *H04W 52/367* (2013.01); *H04W 52/38* (2013.01); *H04W 72/0413* (2013.01); *H04W 72/0446* (2013.01); *H04W 76/046* (2013.01); *H04W 88/12* (2013.01)

(56) References Cited

U.S. PATENT DOCUMENTS

| | | | |
|---|---|---|---|
| 2008/0188260 A1* | 8/2008 | Xiao | H04W 52/146 455/522 |
| 2010/0157895 A1* | 6/2010 | Pani | H04W 52/346 370/328 |
| 2010/0202394 A1* | 8/2010 | Zhang | H04W 52/34 370/329 |
| 2011/0081936 A1* | 4/2011 | Haim | H04W 52/367 455/522 |
| 2011/0310781 A1 | 12/2011 | Kim et al. | |
| 2012/0115537 A1* | 5/2012 | Gaal | H04W 52/146 455/522 |
| 2012/0172079 A1* | 7/2012 | Baldemair | H04W 52/365 455/522 |
| 2012/0327896 A1* | 12/2012 | Lee | H04W 72/044 370/330 |
| 2013/0039286 A1* | 2/2013 | Larsson | H04W 52/146 370/329 |
| 2014/0056278 A1* | 2/2014 | Marinier | H04W 72/044 370/330 |
| 2014/0126461 A1* | 5/2014 | Ghosh | H04W 88/04 370/315 |
| 2014/0219234 A1* | 8/2014 | Kim | H04W 52/365 370/329 |
| 2015/0031410 A1* | 1/2015 | Lim | H04W 52/146 455/522 |
| 2015/0036566 A1* | 2/2015 | Blankenship | H04W 52/281 370/311 |
| 2015/0201383 A1* | 7/2015 | Papasakellariou | H04W 52/367 370/278 |
| 2015/0201388 A1* | 7/2015 | Cheng | H04W 52/14 370/329 |
| 2015/0208366 A1* | 7/2015 | Papasakellariou | H04W 52/0212 370/311 |
| 2015/0215943 A1* | 7/2015 | Vajapeyam | H04W 72/0473 370/329 |
| 2016/0037530 A1* | 2/2016 | Peng | H04W 24/06 370/329 |

* cited by examiner

US 9,357,510 B2

POWER SHARING AND POWER HEADROOM REPORTING IN DUAL CONNECTIVITY SCENARIOS

CROSS-REFERENCE TO RELATED APPLICATION(S)

This application claims benefit of U.S. Provisional Patent Application Ser. No. 61/973,126, filed Mar. 31, 2014, which is herein incorporated by reference in its entirety.

BACKGROUND

1. Field of the Disclosure

Aspects of the present disclosure related generally to wireless communications systems, and more particularly, to power sharing and power headroom reporting in dual connectivity operations.

2. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for power sharing and power headroom reporting in dual connectivity operations are described herein.

In an aspect, a method for wireless communications is provided. The method may be performed, for example, by a user equipment (UE). The method generally includes determining a maximum available transmit power of the UE, semi-statically configuring a first minimum guaranteed power available for uplink transmission to a first base station and a second minimum guaranteed power available for uplink transmission to a second base station, and dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

In an aspect, an apparatus for wireless communications by a UE is provided. The apparatus generally includes at least one processor configured to: determine a maximum available transmit power of the UE, semi-statically configure a first minimum guaranteed power available for uplink transmission to a first base station and a second minimum guaranteed power available for uplink transmission to a second base station, and dynamically determine a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power; and a memory coupled with the at least one processor.

In an aspect, an apparatus for wireless communications by a UE is provided. The apparatus generally includes means for determining a maximum available transmit power of the UE, means for semi-statically configuring a first minimum guaranteed power available for uplink transmission to a first base station and a second minimum guaranteed power available for uplink transmission to a second base station, and means for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

In an aspect, a computer readable medium storing computer executable code is provided. The computer executable code generally includes code for determining a maximum available transmit power of the UE, code for semi-statically configuring a first minimum guaranteed power available for uplink transmission to a first base station and a second minimum guaranteed power available for uplink transmission to a second base station, and code for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
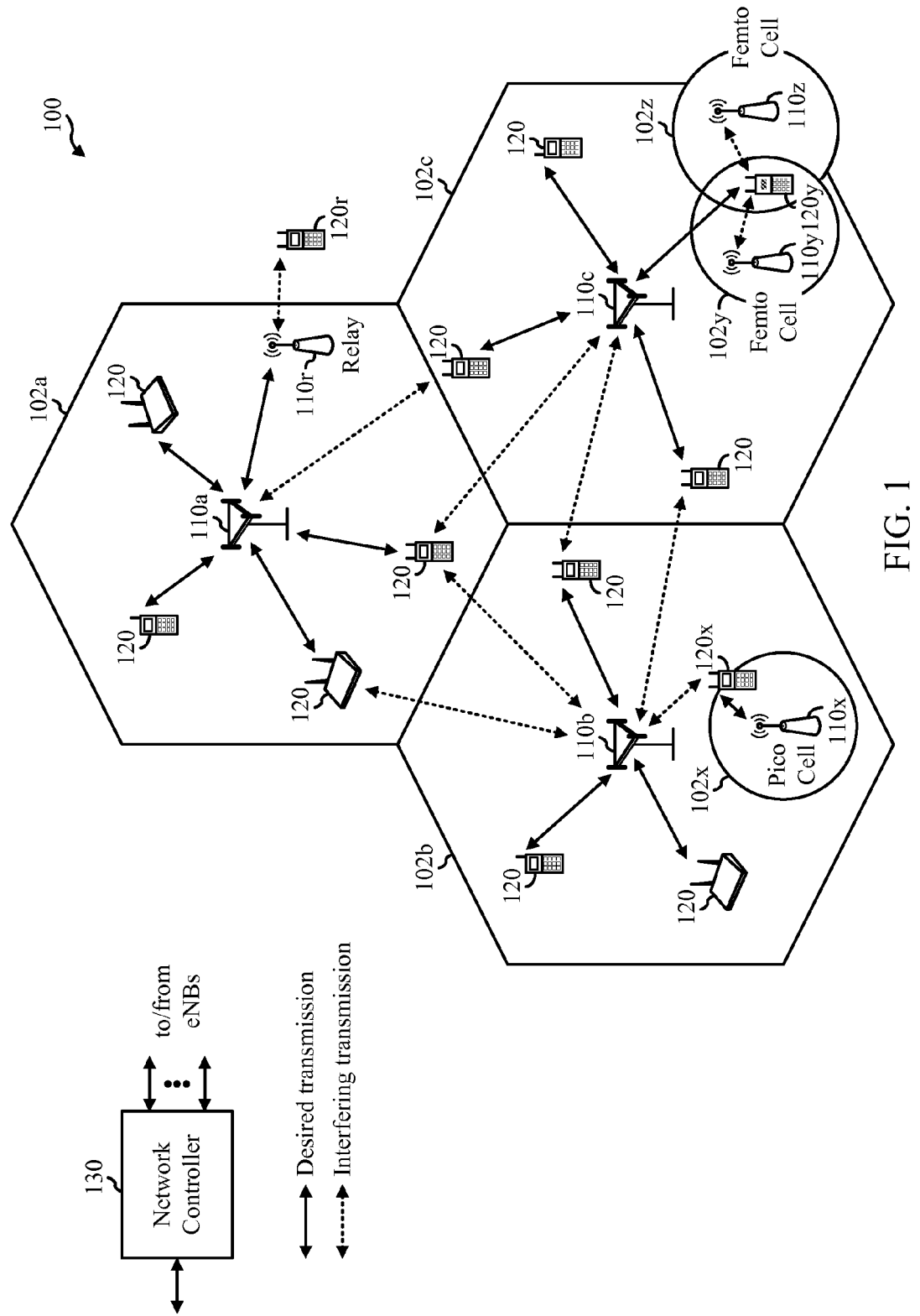
FIG. 1 is a block diagram conceptually illustrating an example telecommunications system, according to aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure provide apparatus, methods, processing systems, and computer program products for power sharing and power headroom reporting in dual connectivity operations. As will be described in further detail herein, a user equipment (UE) may provide power headroom reporting (PHR) across all cells such that the eNBs (e.g., Master eNB and Secondary eNB) can coordinate power sharing. According to certain aspects, the UE can determine available transmit power for uplink transmissions to a first base station based on a total maximum available transmit power of the UE and based on power designated for uplink transmissions to another base station. According to certain aspects, the UE can borrow unused power designated for uplink transmission to a base station for uplink transmission to a different base station. According to certain aspects, the power designated for uplink transmission to the base stations may be based on prioritization.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Example Wireless Communications System

FIG. 1 shows a wireless communication system 100 in which aspects of the present disclosure may be practiced. For example, a UE 120 may determine a maximum available transmit power of the UE 120. The UE 120 may support dual-connectivity to more than eNB 110. The UE 120 may determine a maximum available transmit power of the UE 120. The UE 120 may semi-statically (e.g., via radio resource control (RRC) signaling) a guaranteed minimum power available for uplink transmission to a first eNB 110 and second eNB 110. The UE 120 may then determine a maximum transmit power available for uplink transmission to the first and second eNB 110 based, at least in part, on the maximum transmit power of the UE, the first minimum guaranteed power and the second minimum guaranteed power. The UE 120 may send the determined maximum transmit power for the first and second eNB 110 in a power headroom report (PHR) to the eNBs 110.

The system illustrated in FIG. 1 may be, for example, a long term evolution (LTE) network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
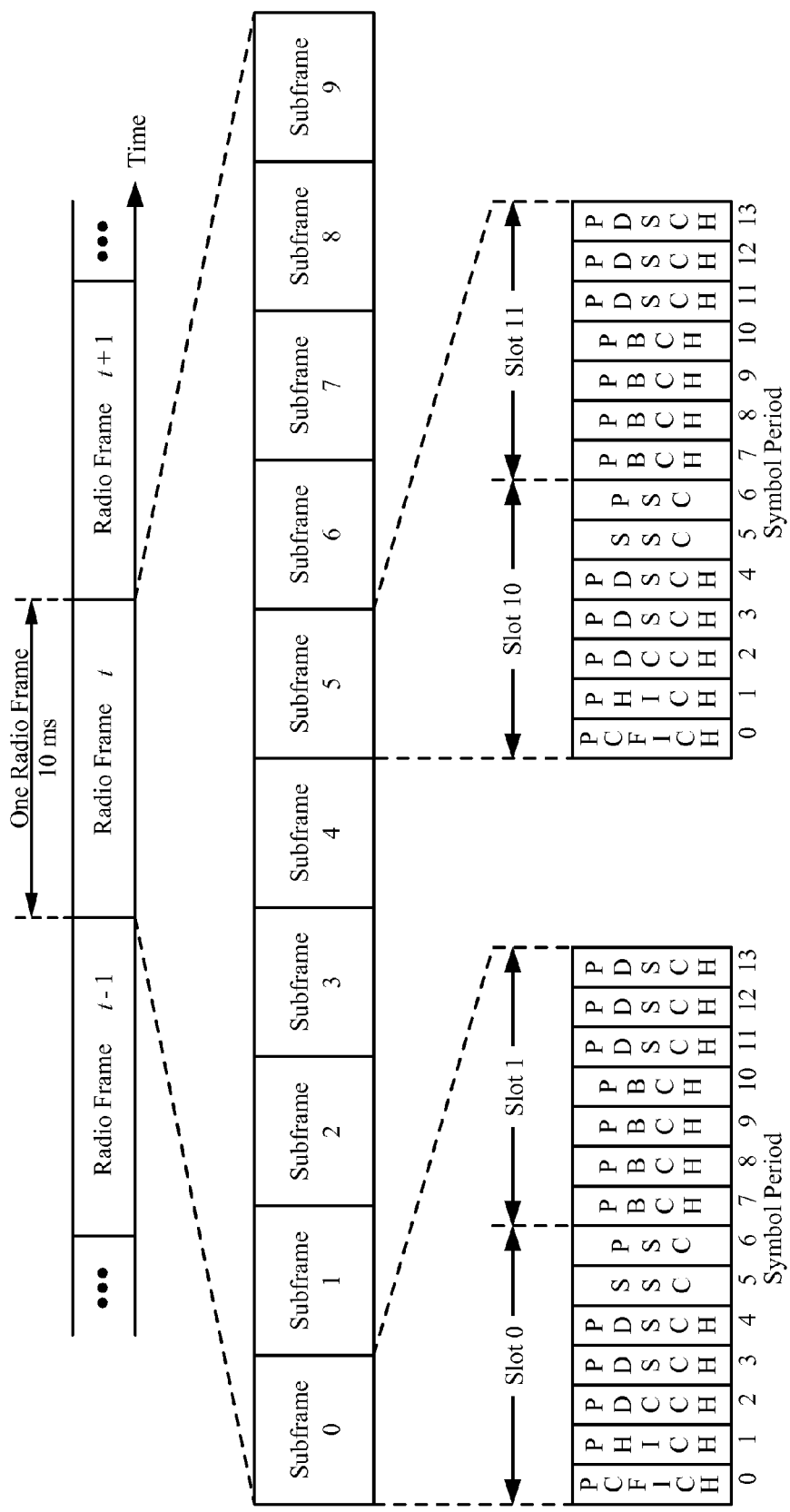
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of sub-frame 0. The PBCH may carry certain system information.

The eNodeB may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
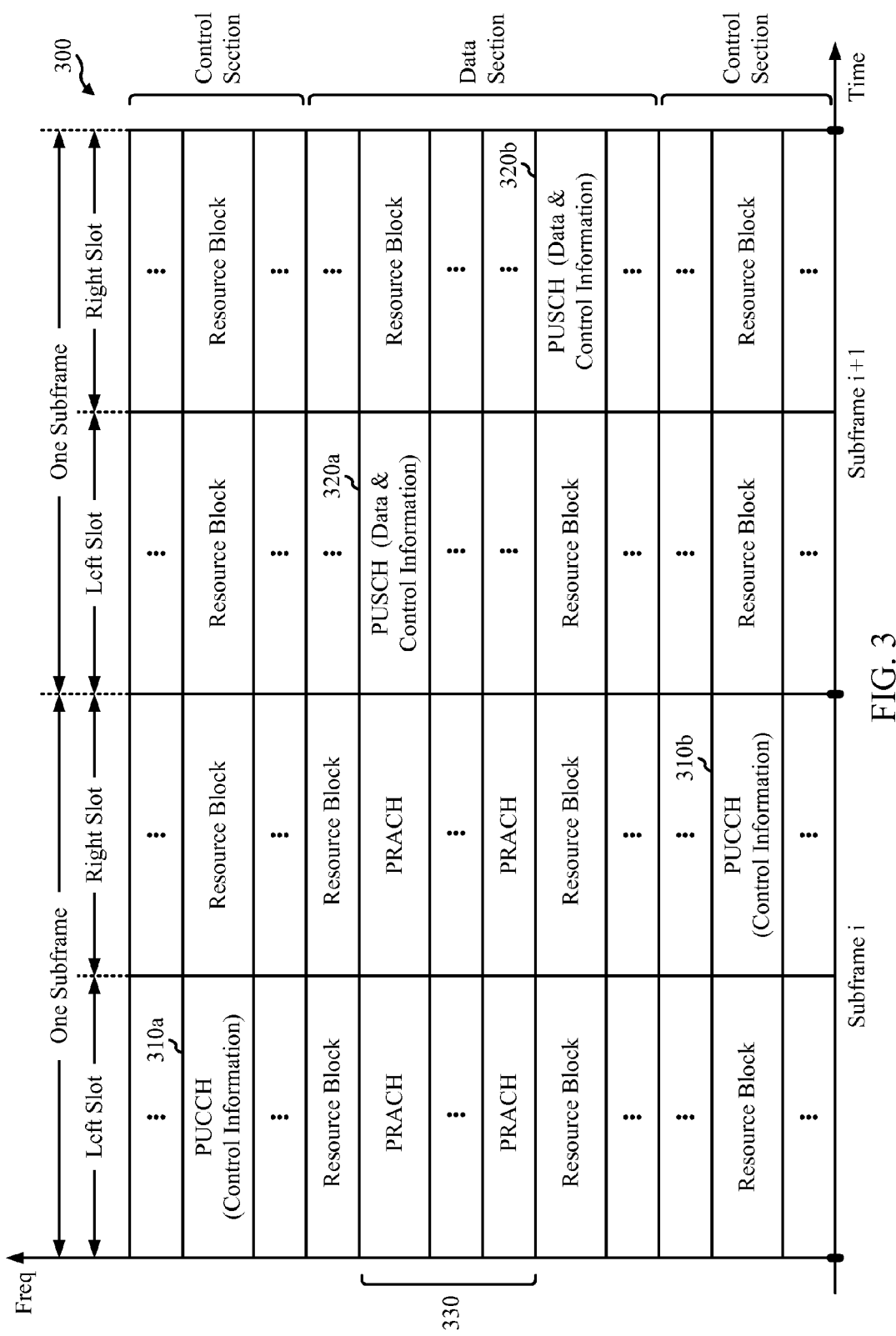
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to an eNB. The UE may also be assigned resource blocks 320a, 320b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
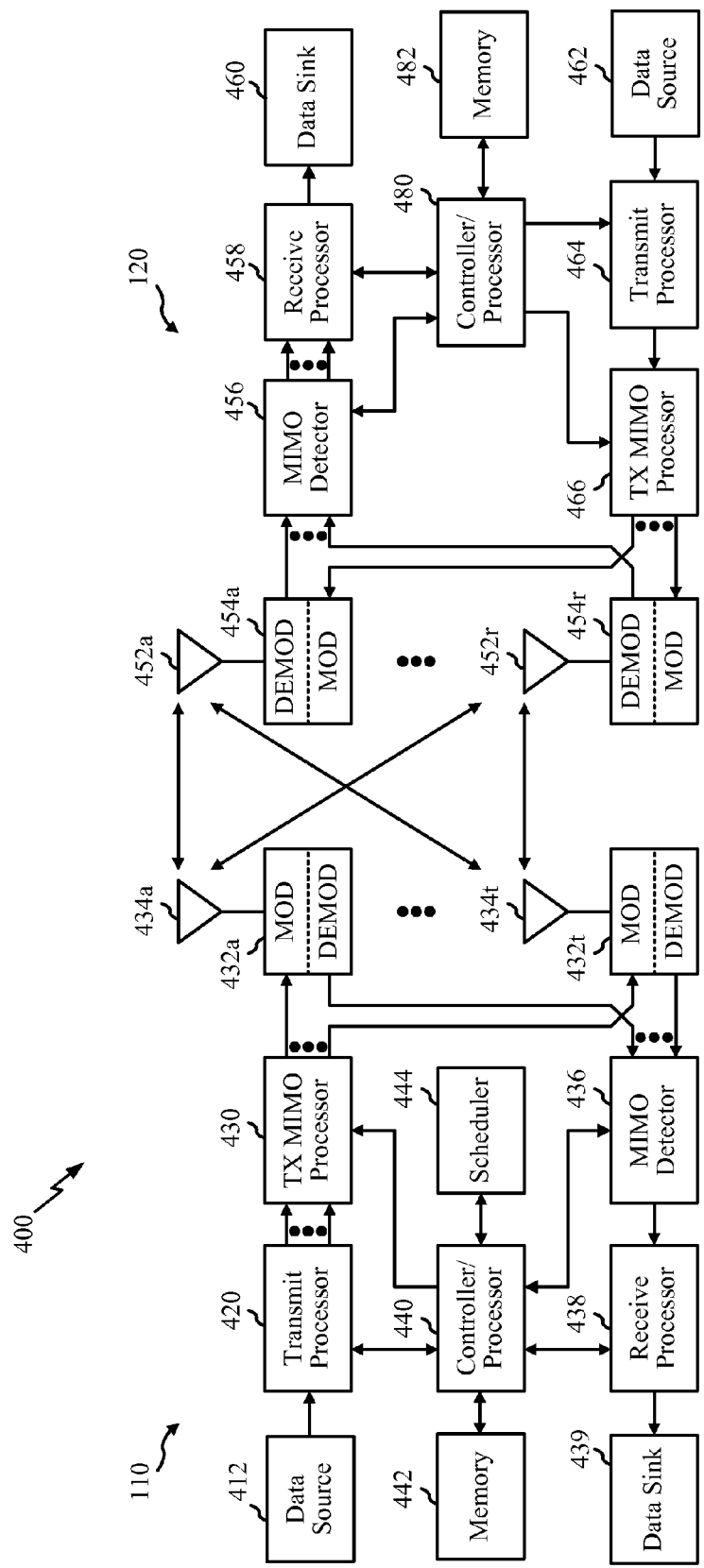
FIG. 4 is a block diagram conceptually illustrating a design of an example eNodeB and user equipment (UE), according to aspects of the present disclosure.

FIG. 4 illustrates example components of the base station/eNB 110 and UE 120 illustrated in FIG. 1, which may be used to implement aspects of the present disclosure. One or more components of the AP 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9 and 14-17.

FIG. 4 shows a block diagram of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 9 and 13-17, and/or other processes for the techniques described herein. The memories 442 and 482 may store data and program codes for the base station 110 and the UE 120, respectively. A scheduler 444 may schedule UEs for data transmission on the downlink and/or uplink.

In one configuration, the base station 110 includes means for generating a compact Downlink Control Information (DCI) for at least one of uplink (UL) or downlink (DL) transmissions, wherein the compact DCI comprises a reduced number of bits when compared to certain standard DCI formats; and means for transmitting the DCI. In one aspect, the aforementioned means may be the controller/processor 440, the memory 442, the transmit processor 420, the modulators 432, and the antennas 434 configured to perform the functions recited by the aforementioned means. In another aspect, the aforementioned means may be a module or any apparatus configured to perform the functions recited by the aforementioned means. In one configuration, the UE 120 includes means for receiving compact Downlink Control Information (DCI) for at least one of uplink (UL) or downlink (DL) transmissions, wherein the DCI comprises a reduced number of bits of a standard DCI format; and means for processing the DCI. In one aspect, the aforementioned means may be the controller/processor 480, the memory 482, the receive processor 458, the MIMO detector 456, the demodulators 454, and the antennas 452 configured to perform the functions recited by the aforementioned means. In another aspect, the aforementioned means may be a module or any apparatus configured to perform the functions recited by the aforementioned means.

Figure 5:
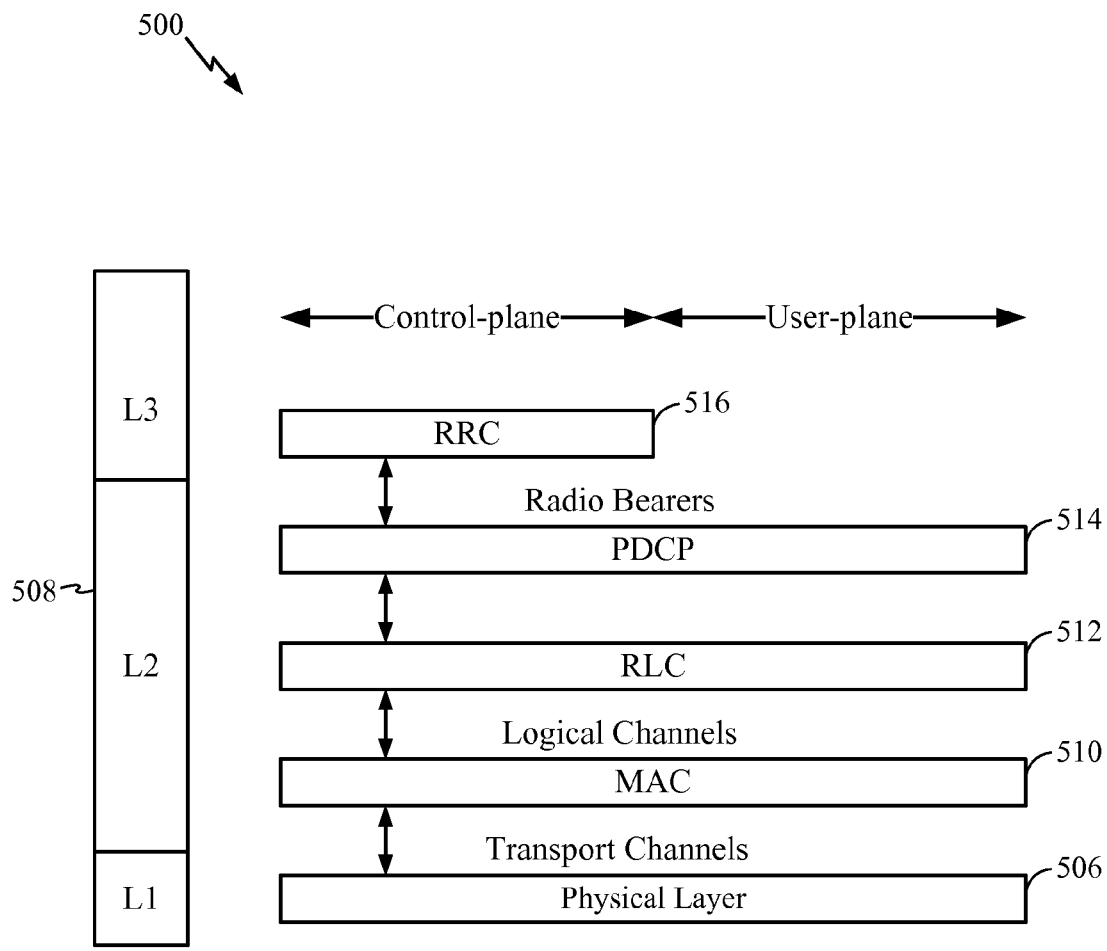
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
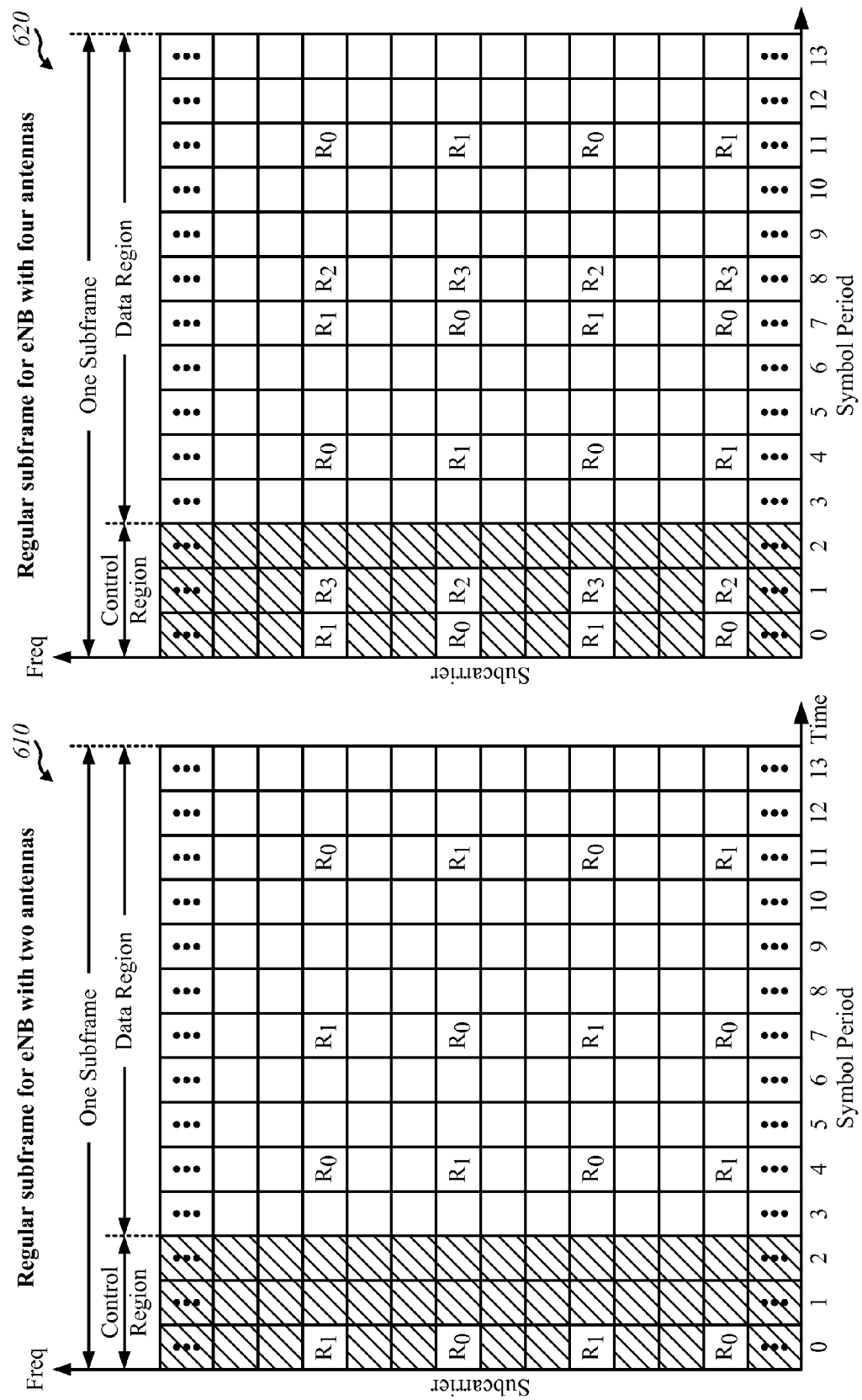
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different eNBs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example Carrier Aggregation

Figure 7:
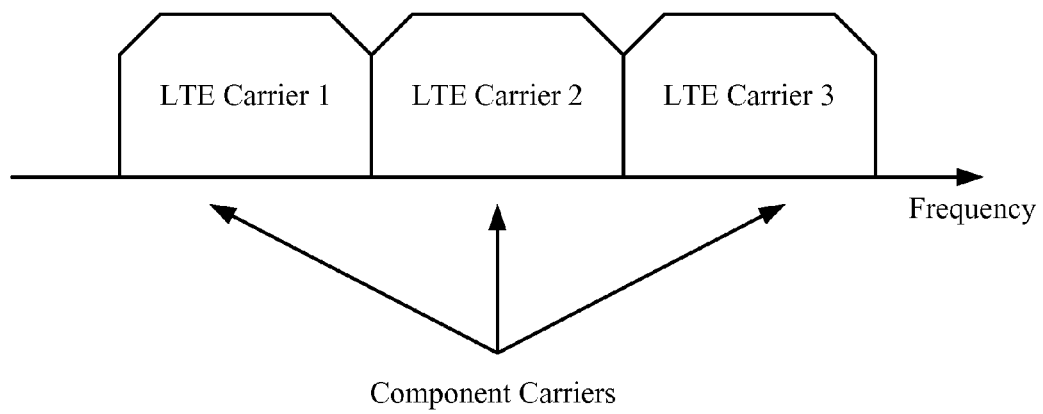
FIG. 7 illustrates an example continuous carrier aggregation type, according to aspects of the present disclosure.
Figure 8:
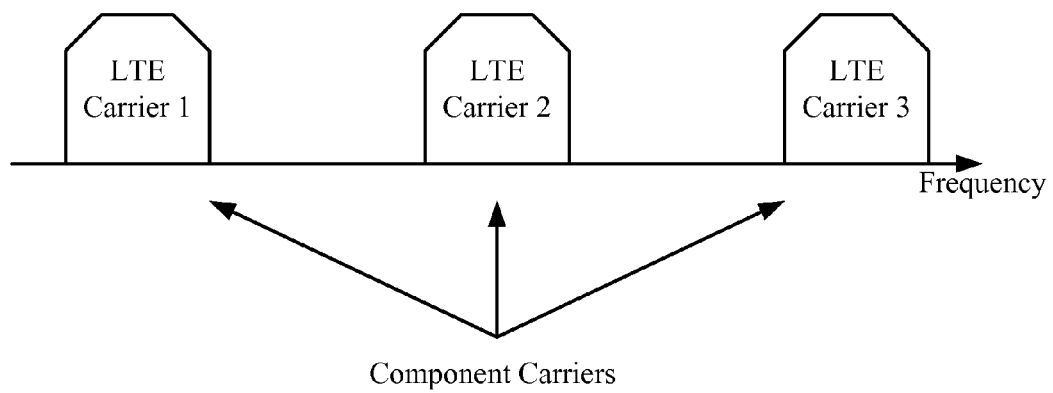
FIG. 8 illustrates an example non-continuous carrier aggregation type, according to aspects of the present disclosure.
Figure 9:
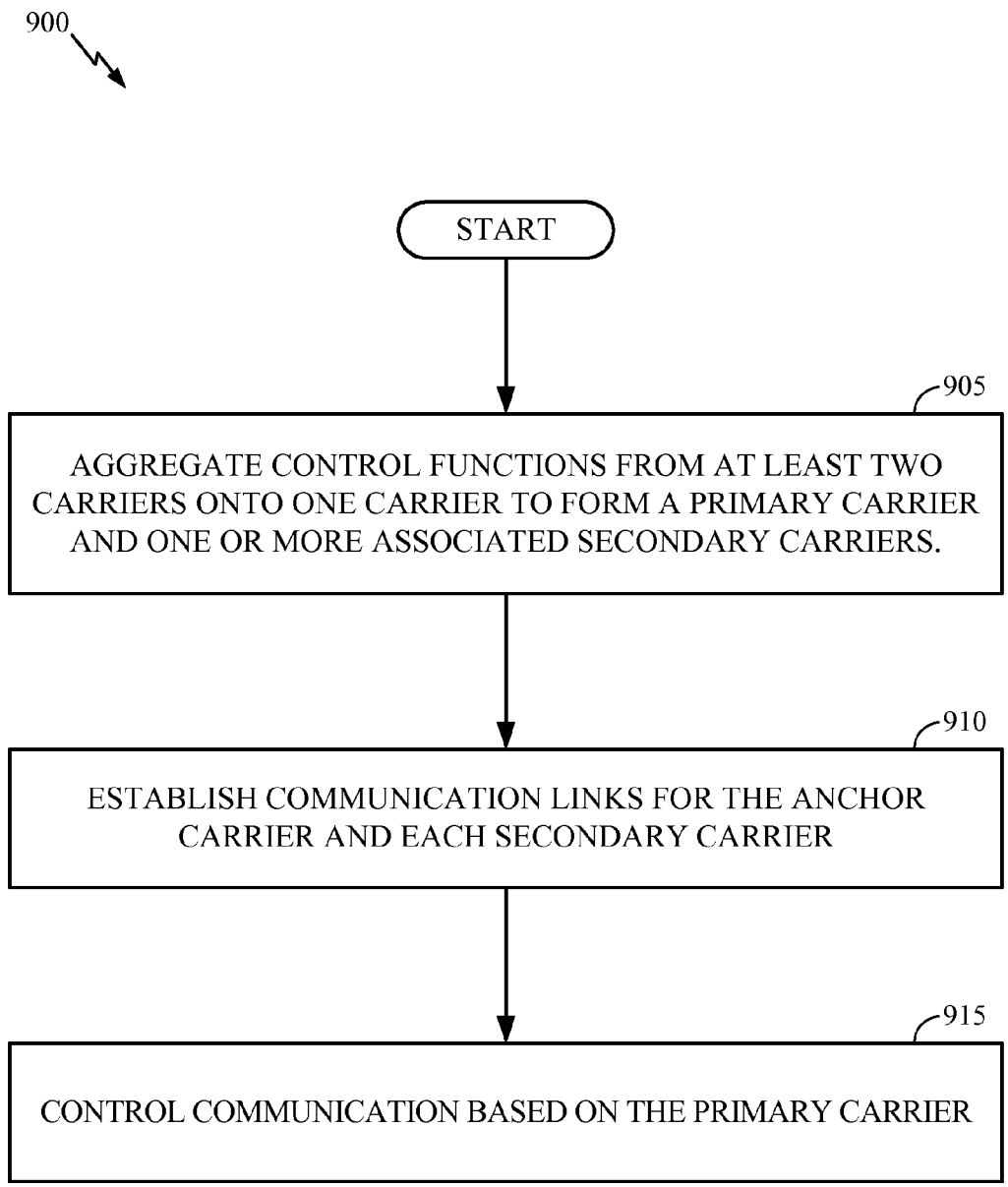
FIG. 9 is a block diagram illustrating example operations for controlling radio links in multiple carrier configurations, according to aspects of the present disclosure.

LTE-Advanced UEs may use spectrum of up to 20 MHz bandwidths allocated in a carrier aggregation of up to a total of 100 MHz (5 component carriers) used for transmission in each direction. For the LTE-Advanced mobile systems, two types of carrier aggregation (CA) methods have been proposed, continuous CA and non-continuous CA. They are illustrated in FIGS. 7 and 8. Continuous CA occurs when multiple available component carriers are adjacent to each other (FIG. 7). On the other hand, non-continuous CA occurs when multiple available component carriers are separated along the frequency band (FIG. 8). Both non-continuous and continuous CA aggregate multiple LTE/component carriers to serve a single unit of LTE Advanced UE. According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). FIG. 9 illustrates a method 900 for controlling radio links in a multiple carrier wireless communication system by grouping physical channels according to one example. As shown, the method includes, at block 905, aggregating control functions from at least two carriers onto one carrier to form a primary carrier and one or more associated secondary carriers. Next at block, 910, communication links are established for the primary carrier and each secondary carrier. Then, communication is controlled based on the primary carrier in block 915.

Example Multiflow

Figure 10:
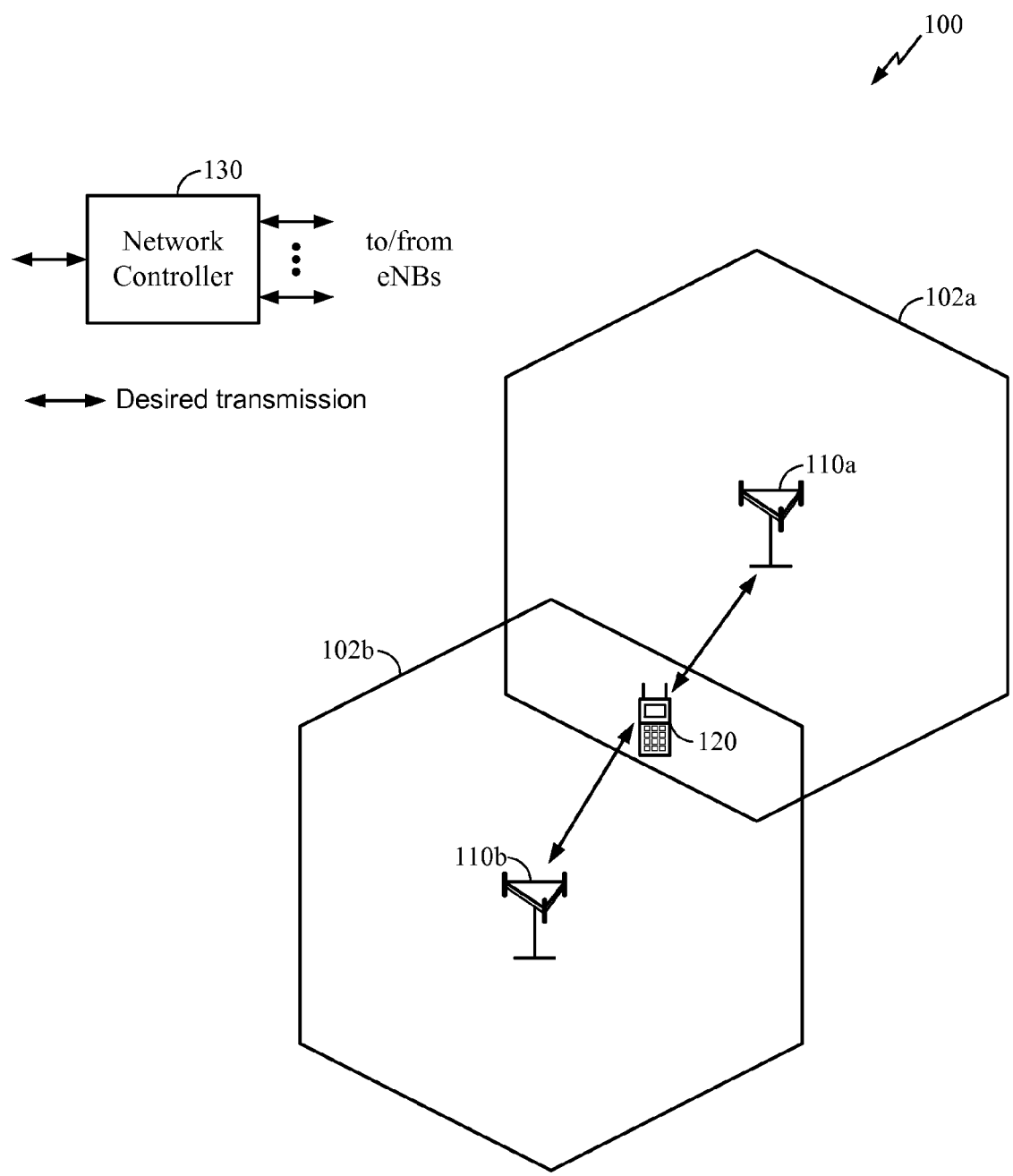
FIG. 10 illustrates an example dual connectivity scenario using multiflow to deliver simultaneous data streams, according to aspects of the present disclosure.

Presently, UEs receive data from one eNodeB. However, users on a cell edge may experience high inter-cell interference which may limit the data rates. Multiflow allows users to receive data from two eNodeBs simultaneously. It works by sending and receiving data from the two eNodeBs in two totally separate streams when a UE is in range of two cell towers in two adjacent cells at the same time. The UE talks to two towers simultaneously when the device is on the edge of either towers' reach (see FIG. 10). By scheduling two independent data streams to the mobile device from two different NodeBs at the same time, multiflow exploits uneven loading in networks. This helps improve the cell edge user experience while increasing network capacity. In one example, throughput data speeds for users at a cell edge may double. "Multiflow" is similar to dual-carrier HSPA, however, there are differences. For example, dual-carrier HSPA doesn't allow for connectivity to multiple towers to connect simultaneously to a device.

Example Power Headroom

Figure 11:
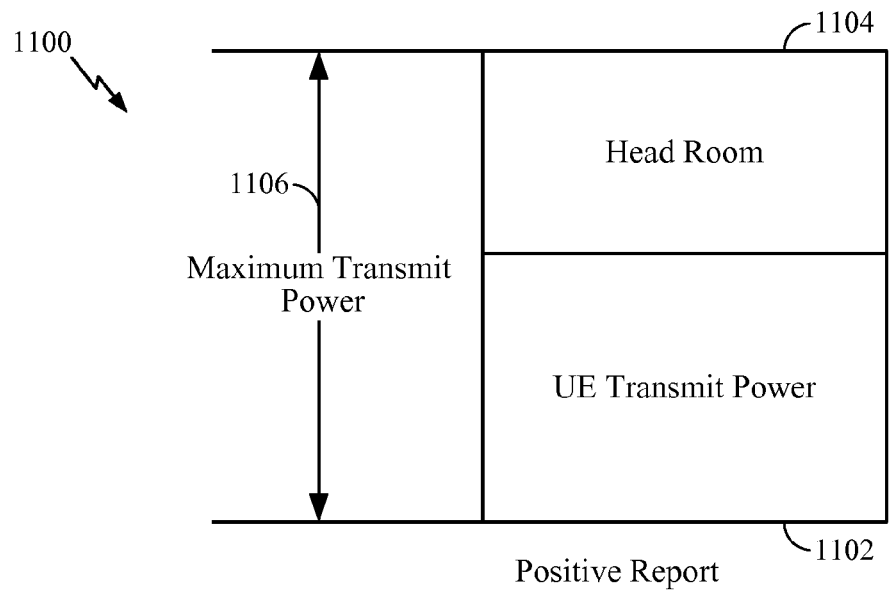
FIG. 11 is a diagram illustrating an example positive headroom report, according to aspects of the present disclosure.
Figure 12:
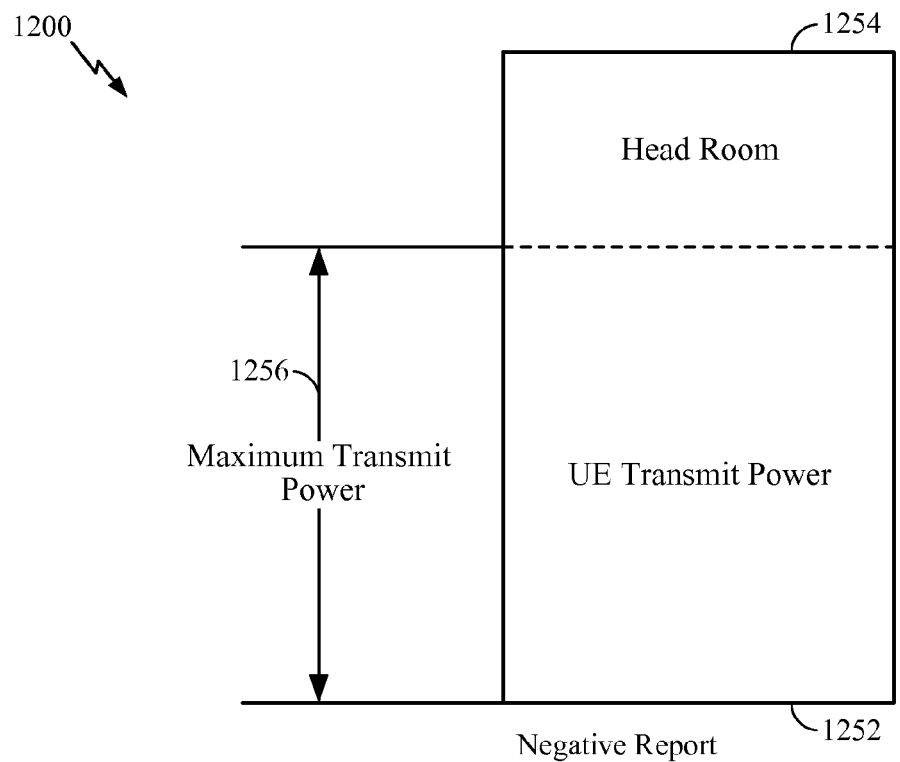
FIG. 12 is a diagram illustrating an example negative power headroom report, according to aspects of the present disclosure.

FIG. 11 is a diagram 1100 illustrating a positive power headroom report. FIG. 12 is a diagram 1200 illustrating a negative power headroom report (PHR). The PHR reports the available headroom available at the UE. Power headroom provides an indication of how far from the rated power the power amplifier operates before it enters a non-linear region of operation. The PHR is transmitted from the UE to the eNB in order to inform the eNB about transmission power abilities or limitations at the UE. Information concerning the power spectral density used at the UE is provided by the PHR. In one example, the PHR is encoded as six bits with a reporting range from +40 dB to −23 dB in 1 dB increments. A total of 64 different power headroom values are represented by the 6-bit signaling. The negative part of the reporting range is used by the UE to signal to the eNodeB the extent to which the uplink resource grant it received needs more transmission power than a current UE transmit power 802. In response, the eNodeB may reduce the size of a subsequent grant. Maximum power reduction (MPR) may be defined by the associated wireless communications protocol (e.g., 3GPP standards) to control how much a power amplifier backs off from a maximum transmission power (MTP), or used to adjust the MTP, in order to establish a modified MTP which is used during the transmission of the corresponding waveform.

Example Dual Connectivity

Figure 13:
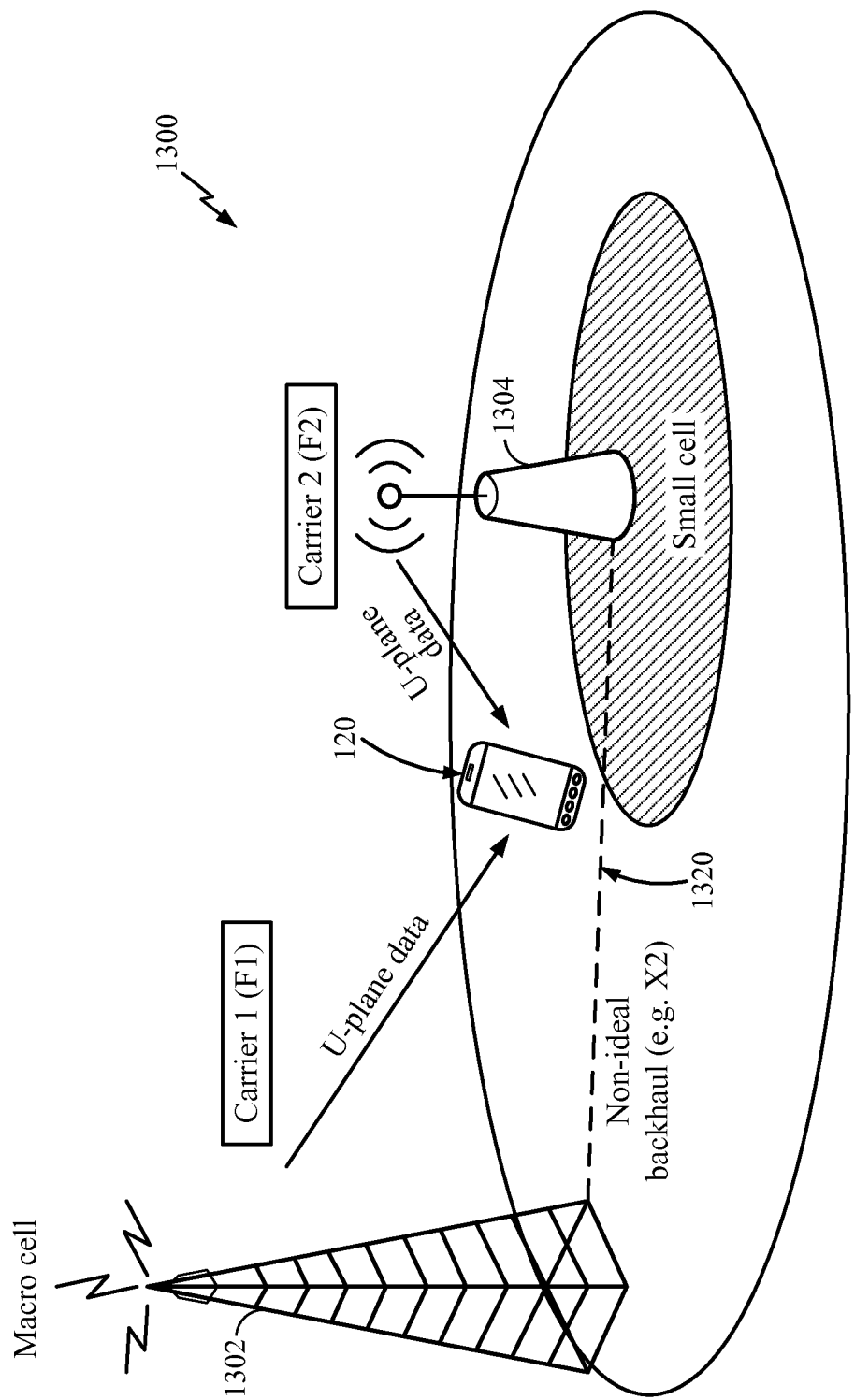
FIG. 13 is a diagram illustrating an example dual connectivity scenario, according to aspects of the present disclosure.

Dual connectivity may have benefits in the cellular industry. A dual connectivity solution enables a UE to simultaneously connect to two eNBs—a Master eNB (MeNB) and a secondary eNB (SeNB) which are not collocated and can be connected via a non-ideal backhaul (e.g., backhaul 1320). Thus, the different eNBs may use different schedulers, etc. As shown in FIG. 13, the UE 120 may be dually connected to the macro cell 1302 and the small cell 1304, and the eNBs may be connected via a non-ideal backhaul 1320 and operate on different carrier frequencies. With carrier aggregation multiple LTE/component carriers are aggregated to serve a single unit of LTE Advanced UE.

In certain aspects, due to the distributed nature of this deployment scenario (separate eNBs connected via a non-ideal backhaul) separate uplink control channels for both eNBs (MeNB and SeNB) are used to support distributed scheduling and independent MAC (Medium Access Control) operation across eNBs. This is unlike CA (Carrier Aggregation) deployment, in which a single MAC/scheduling entity operates across all the carriers and a single uplink control channel is used.

In the current LTE specification, the Primary Cell (PCell of MeNB) is the only cell carrying the uplink control channels, e.g., the PUCCH. For dual connectivity, a special cell on the SeNB is introduced in order to support the uplink control channels for the SeNB. Also, with dual connectivity uplink control channels for both the MeNB and the SeNB are used, one for each eNB. The presence of an uplink control channel for the SeNB motivates the use for a SeNB Radio Link Monitoring (S-RLM) procedure. This procedure may be used by the UE to trigger SeNB Radio Link Failure (S-RLF). The S-RLF is useful, among other things, to trigger procedures that prevent a UE from jamming the uplink control channels when it loses downlink connection to a SeNB. Another reason a special RLF procedure may be used for the SeNB is that the MeNB may experience different channel conditions than the SeNB.

In certain aspects, unlike the legacy RLF procedure, the S-RLF does not involve loss of RRC connection since the connection to the MeNB remains. Hence, certain C-Plane procedures (such as RRC Connection Reestablishment) may not be applicable under S-RLF.

Example Power Sharing, Scaling, and Power Headroom Reporting in Dual Connectivity Scenarios In dual connectivity, the user equipment UE (e.g., UE 120) may be simultaneously connected to a master e Node B (MeNB) (e.g., Macro 1302) and secondary eNB (SeNB) (e.g., small cell 1304). Carrier aggregation (CA) may be supported in the MeNB and SeNB. The Master Cell Group (MCG) may refer to the group of serving cells associated with the MeNB and the Secondary Cell Group (SCG) may refer to the group of serving cells associated with the SeNB.

Since the MeNB and SeNB operate independently and use different schedulers, the scheduling decisions may not be coordinated at the subframe level. Therefore, it may not be feasible for an eNB to obtain accurate and instantaneous information regarding the desired transmit power by the cell group of the other eNB. This may lead to a situation in which both eNBs attempt to raise the UE transmit power concurrently and cause the UE to exceed its maximum transmit power capability.

In certain systems with carrier aggregation, such as long term evolution (LTE) systems (e.g., LTE Release 10 and beyond), the scheduling decisions can be jointly coordinated across all cells within the eNB which may help to mitigate or avoid the UE transmit power exceeding its maximum transmit power capability.

Accordingly, what is needed are techniques and apparatus for power sharing, power headroom reporting, and power scaling, when a UE is power limited to enable coordination across cells.

Aspects of the present disclosure provide apparatus, methods, processing systems, and computer program products for power sharing and power headroom reporting in dual connectivity operations. As will be described in further detail herein, a UE may provide power headroom reporting (PHR) across all cells such that the eNBs (e.g., MeNB and SeNB) can coordinate power sharing.

According to certain aspects, the UE can determine (maximum) available transmit power for uplink transmissions to a first base station and a second base station based on a guaranteed minimum transmit power of the UE and based on semi-statically configured minimum guaranteed power designated for uplink transmissions to the first and second base station.

According to certain aspects, the UE can borrow unused power designated for uplink transmission to a base station for uplink transmission to a different base station. According to certain aspects, the power designated for uplink transmission to the base stations may be based on prioritization.

Example Power Headroom Reporting

A maximum transmit power may be defined for each of the MCG/MeNB and SCG/SeNB. Thus, each eNB may be allocated a share of the total maximum transmit power, and the allocated share may be applicable to the cell group of that eNB. According to certain aspects, the eNBs can coordinate their desired share in a semi-static fashion in order to ensure the UE's maximum transmit power is not exceeded.

According to certain aspects, to enable the eNBs to coordinate and update their share of the UE's transmit power, the power headroom report (PHR) may include power headroom information of all activated cells for the UE.

A potential drawback of the semi-static per cell group power configuration is that it may not reflect instantaneous scheduling conditions for the UE on a given subframe. For example, if the UE strictly follows the configured value for a cell group, the UE may unnecessarily limit its transmission power in a subframe in which only one eNB is active, while still having sufficient power. That is, the UE may not borrow unused power from a first eNB for a second eNB because that power has already been semi-statically allocated to the first eNB even though the UE is not transmitting to the first eNB—or not utilizing all allocated power for the first eNB.

According to certain aspects, to avoid performance impact in such scenarios, the UE may utilize any unused power remaining from transmissions to one eNB towards satisfying the power requirement of the transmissions to the other eNB. According to certain aspects, PHR may be based on the nominal maximum power value or the configured maximum power value of the corresponding eNB. In other words, PHR for a cell of the MeNB or the SeNB may be calculated with respect to the configured maximum power for that cell.

Example Power Sharing

In an example implementation, dynamic power sharing between the MeNB and the SeNB may be enabled or disabled based on whether the eNBs are synchronous or asynchronous. For example, the UE may indicate that the two eNBs are synchronous and, as a result, dynamic power sharing may be allowed. Alternatively, if the UE indicates asynchronous operation between the two eNBs, then dynamic power sharing may be prohibited (disabled).

Figure 14:
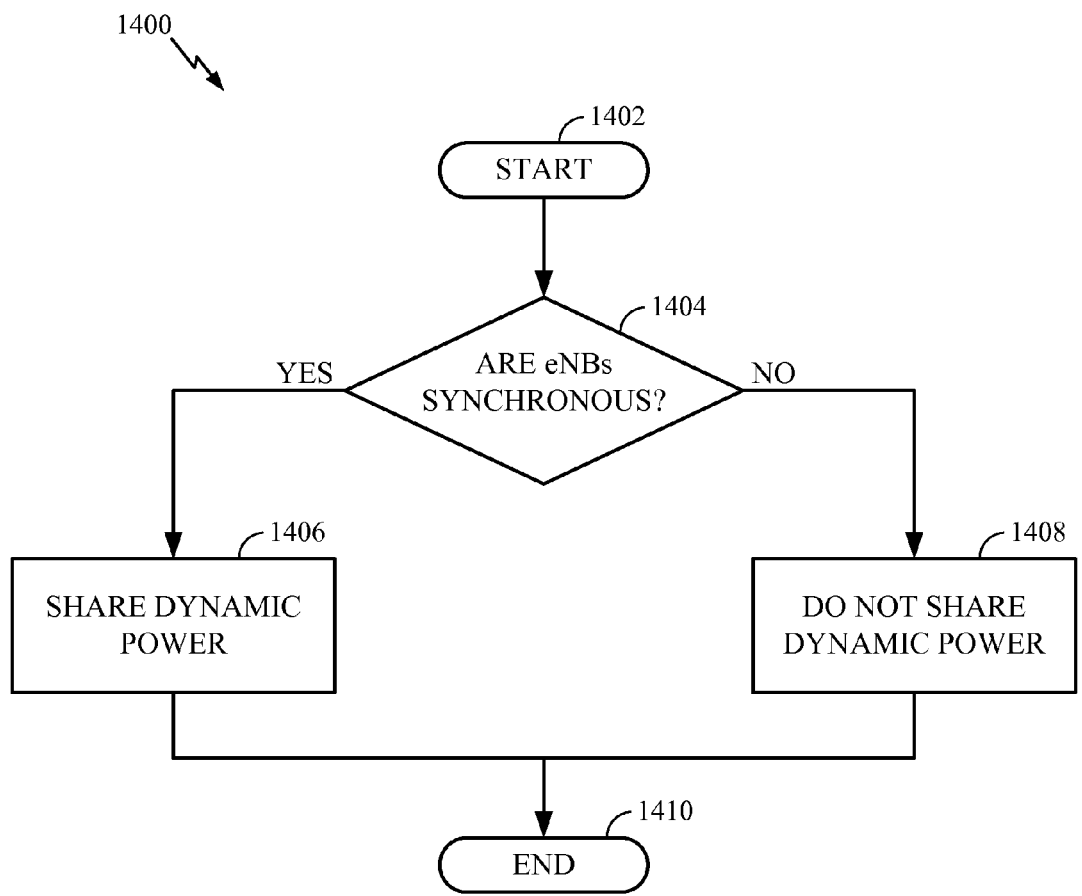
FIG. 14 is a flowchart illustrating an example call flow of operations for enabling/disabling dynamic power sharing between a first eNB and a second eNB based on whether they are synchronous or not, according to aspects of the present disclosure.

FIG. 14 is a flowchart illustrating example operations for enabling/disabling dynamic power sharing between a first eNB and a second eNB based on whether they are synchronous or not, in accordance with certain aspects of the present disclosure. As shown in FIG. 14, the process 1400 may start at 1402. At 1404, it may be determined whether the first and second eNBs are synchronous or asynchronous.

If the eNBs are synchronous, then, at 1406, dynamic power sharing is enabled and, at 1410, the process ends. Alternatively, if the eNBs are asynchronous, then, at 1408, dynamic power sharing is disabled and, at 1410, the process ends.

According to certain aspects, there may be a power limit for each eNB (e.g., a maximum transmit power available for uplink transmission to the eNB) and a power limit for the UE (e.g., a maximum available transmit power). According to certain aspects, for asynchronous operations between the eNBs, it may be desirable to borrow the power allocated for uplink transmissions to one eNB, for example, from the power allocated for uplink transmissions to another eNB. Uplink transmissions to the other eNB may overlap uplink transmissions to the first eNB (e.g., transmissions to the eNBs may be in two overlapping transmission time intervals (TTIs)).

According to certain aspects, the UE may consider the overlapping uplink transmissions to the second eNB when determining if and how much power it could borrow from the power designated for the second eNB. For example, the TTI may be one subframe long. The UL transmissions may overlap in time, but may be on different carrier frequencies.

Thus, because the UE can aggregate carriers, the UE may communicate simultaneously (e.g., on overlapping TTIs) to the first eNB and the second eNB over the different carrier frequencies. According to certain aspects, the two overlapping subframes may be regular uplink subframes, regular downlink subframes, or special subframes, depending on time division duplexing (TDD)/frequency division duplexing (FDD) operations.

In an example implementation, during the uplink transmission to the first eNB on frequency f1 and subframe n, the UE may send two uplink transmissions to the second eNB on frequency f2 on subframes n and n+1 respectively, at least partially overlapping in time with the subframe n on f1. The UE may consider the maximum of the desired power for the two overlapping uplink transmissions toward the second eNB when determining if and how much power it could borrow from the power designated for the second eNB to use for the uplink transmission to the first eNB.

For example, the UE may borrow an amount of power, designated for the second eNB, that does not exceed the smaller value of the leftover power from the transmissions to the second eNB during the overlapping TTIs. If the transmit power in the overlapping period to the second eNB does not exceed the maximum allowed transmit power to the second eNB, the UE may borrow power from the second eNB for uplink transmission in a subframe to the first eNB. Alternatively, the UE may borrow power for uplink transmission in a subframe to the first eNB, only if the two overlapping subframes of the second eNB have no uplink transmissions.

According to certain aspects, when borrowing power from the pool (i.e., share of maximum transmit power) designated to the second eNB to use for uplink transmission to the first eNB, the borrowed power may be designated for use in transmitting channels of the first eNB according to prioritization (e.g., according to the priorities described in the LTE Rel-10/11 rules).

Figure 15:
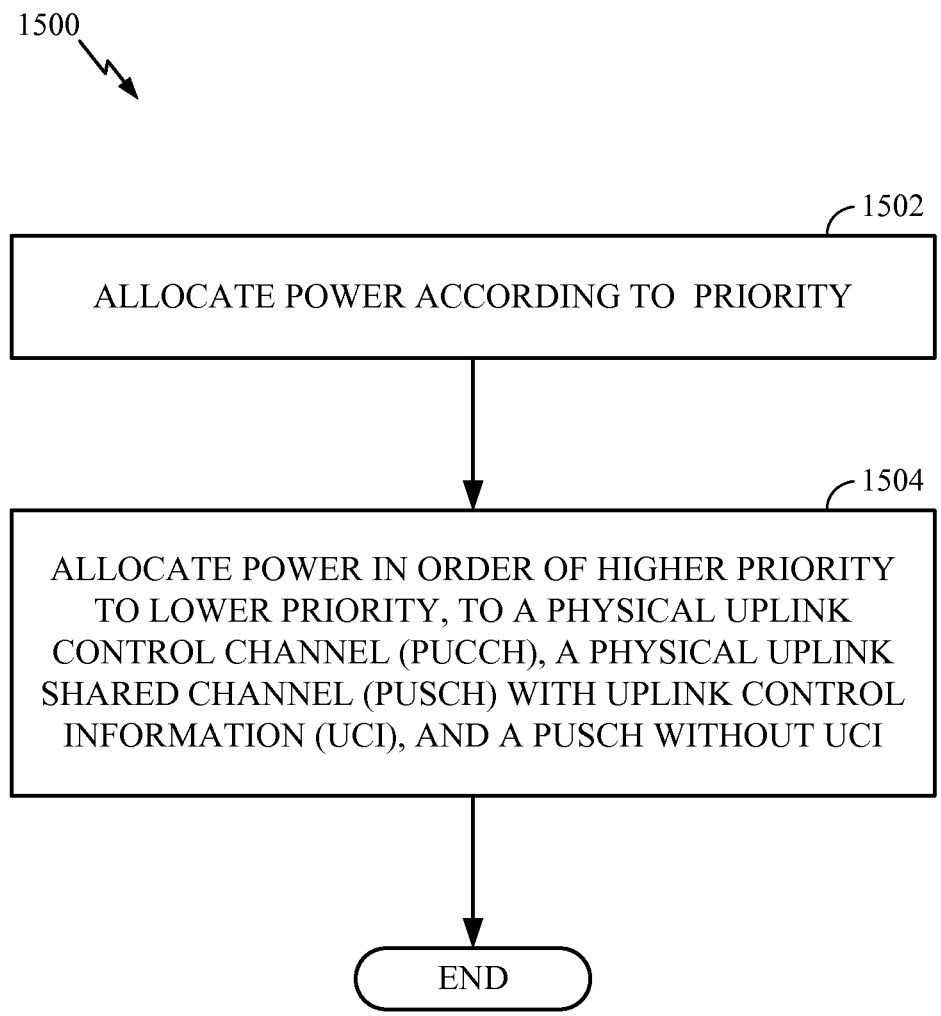
FIG. 15 is a flowchart illustrating example operations for power sharing between a first eNB and a second eNB according to priority rules, according to aspects of the present disclosure.

FIG. 15 is a flowchart 1500 illustrating power sharing between a first eNB and a second eNB according to priority rules, in accordance with certain aspects of the present disclosure. For example, as illustrated in FIG. 15, power may be allocated according to priority (1502) by allocating power in order of higher priority first to a physical uplink control channel (PUCCH), then to a physical uplink shared channel (PUSCH) carrying uplink control information (UCI), and then remaining power for a PUSCH without UCI (1504).

According to certain aspects, the UE may borrow power designated for transmission to the second eNB to use for transmission to the first eNB only if there is a leftover (i.e., unused) power from the power designated for the transmission to the second eNB. For example, the UE may only borrow power designated for uplink transmission to the second eNB after the desired power for all channels to be transmitted to the second eNB by the UE are satisfied.

According to certain aspects, the UE may dynamically share power across eNBs and channels based on across-eNB channel prioritization. In an example implementation, the UE may first consider the MeNB borrowing the power from the SeNB for all channels. Priority may be given to the uplink channels of the MeNB over transmissions of corresponding uplink channels by the UE to the SeNB.

For example, the power for PUSCH with UCI to be transmitted to MeNB could be borrowed from the power pool for SeNB, although the UE may not have enough leftover power after that to transmit the PUSCH with or without UCI to the SeNB. Alternatively, the UE may first consider borrowing the power from the SeNB for uplink transmissions to the MeNB only for channels carrying control information such as UCI (i.e., PUCCH and PUSCH with UCI).

According to certain aspects, power for channels carrying data, such as PUSCH transmissions, to one eNB may be borrowed from the maximum transmit power of the other eNB only if there is leftover power after the power requirement for PUSCH transmission to the other eNB is satisfied.

Alternatively, the overall power left for PUSCH transmissions may be uniformly distributed across all PUSCHs transmitted to the eNBs by the UE. In yet another alternative, the overall power left for PUSCH transmissions may depend on UE implementation. For example, transmission of PUSCH that carries traffic with a higher grade of service (e.g., quality of service (QoS) based) may be prioritized. Uplink transmission of the PUSCH may be to the MeNB or SeNB depending on which has a higher grade of service.

Figure 16:
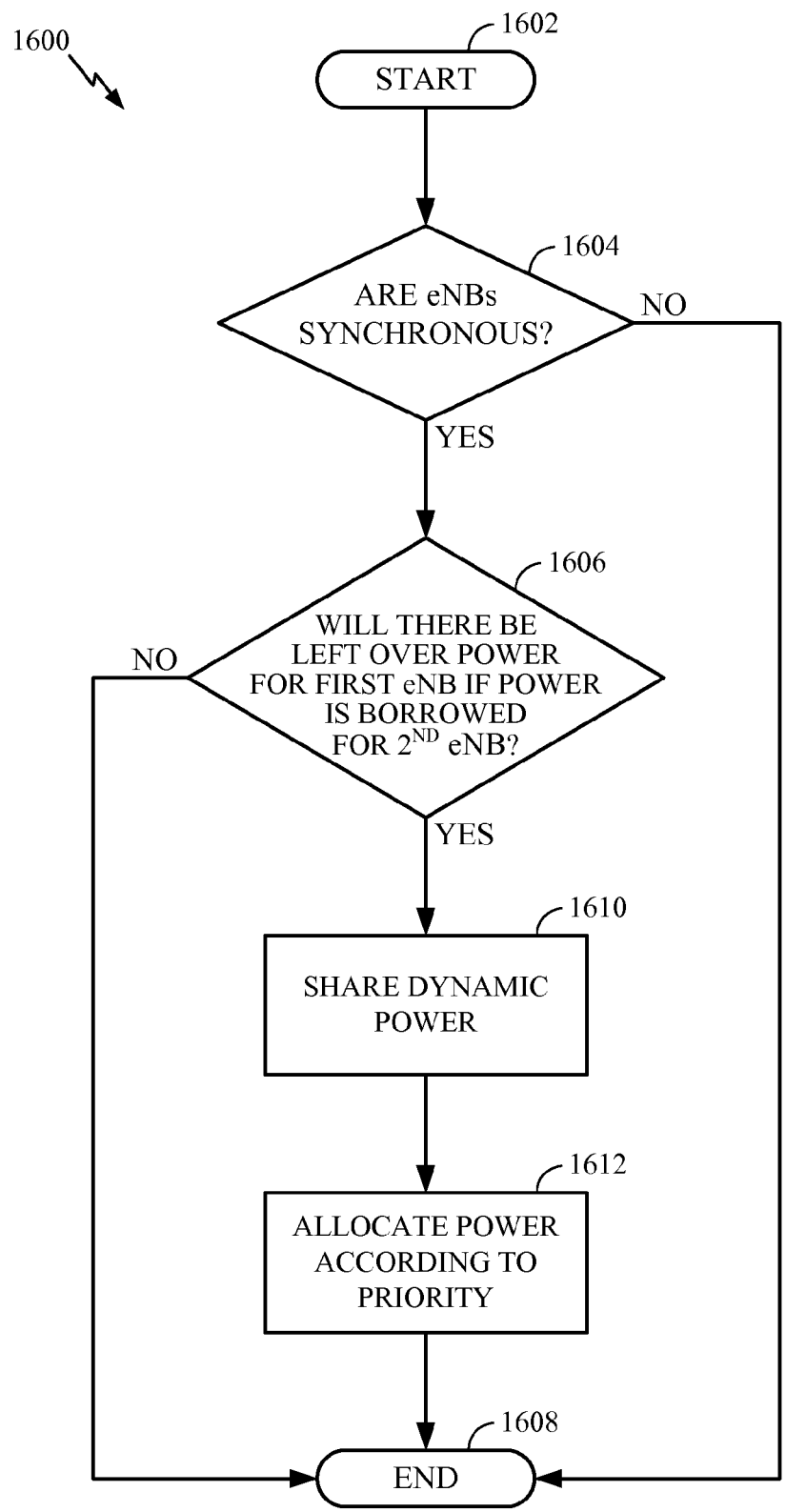
FIG. 16 is a flowchart illustrating an example call flow of operations for power sharing between a first eNB and a second eNB based on whether they are synchronous or not and according to priority rules, according to aspects of the present disclosure.

FIG. 16 is a flowchart illustrating power sharing between a first eNB and a second eNB based on whether they are synchronous or not and according to priority rules, in accordance with certain aspects of the present disclosure. As shown in FIG. 16, the process 1600 may start at 1602. At 1604, it may be determined whether the first and second eNBs are synchronous or asynchronous.

If the eNBs are asynchronous the process stops, at 1608. Alternatively, if the eNBs are synchronous, then, at 1606, it may be determined whether there will be left over power for the first eNB if power is borrowed for the second eNB. If not, the process ends at 1608. If there will be left over power, dynamic power sharing may be enable at 1610 and, at 1612, power may be allocated according to priority and the process ends at 1608.

Figure 17:
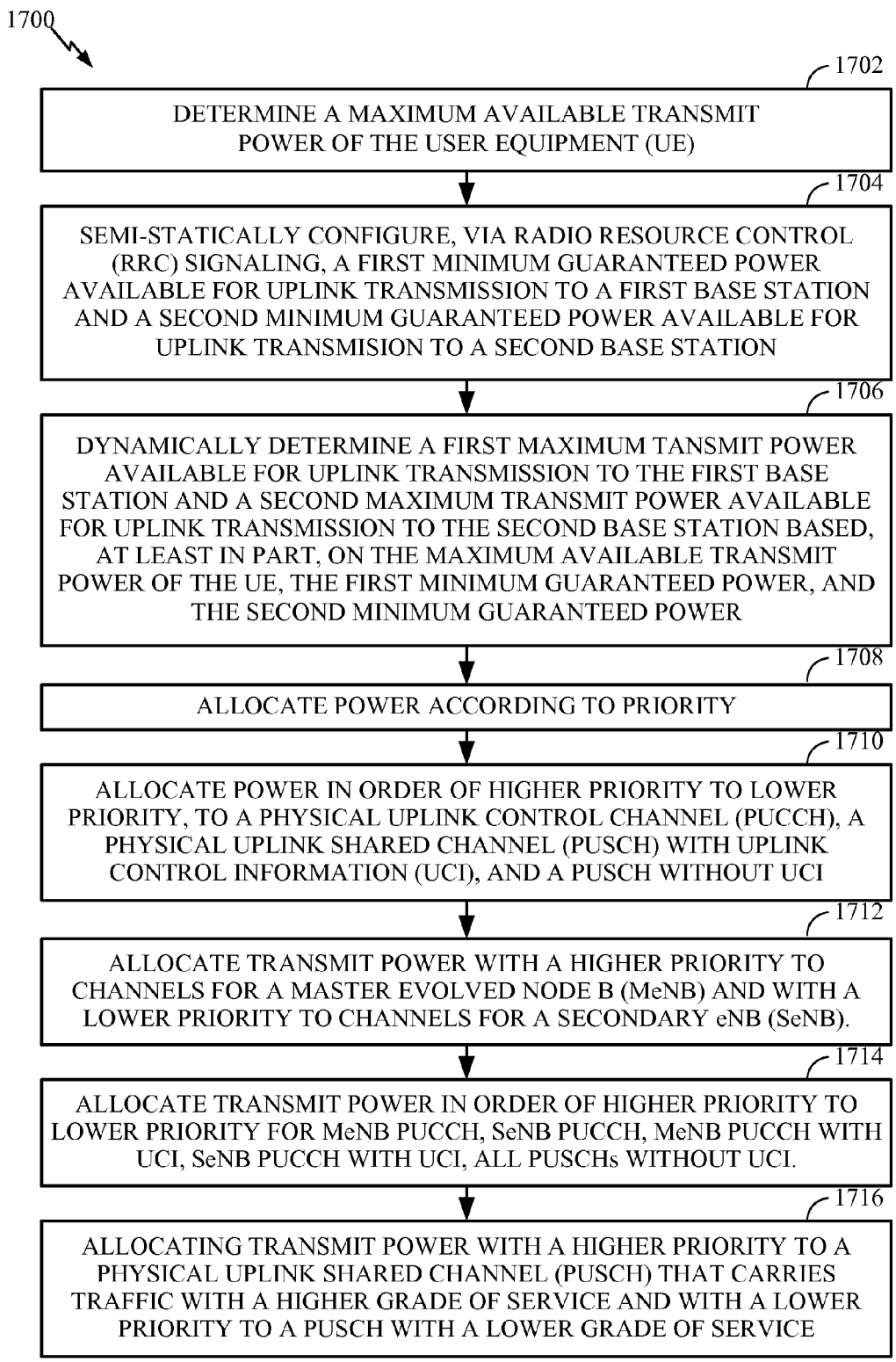
FIG. 17 is a flowchart illustrating example operations for wireless communications by a UE, according to aspects of the present disclosure.

FIG. 17 illustrates example operations 1700 for wireless communications, in accordance with certain aspects of the presented disclosure. The operations 1700 may be performed, for example, by a UE (e.g., UE 120). Operations 1700 may begin at 1702 by determining a maximum available transmit power of the UE. At 1704, the UE may semi-statically configure a first minimum guaranteed power available for uplink transmission to a first base station and a second minimum guaranteed power available for uplink transmission to a second base station.

At 1706, the UE may dynamically determine a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

At 1708, power may be allocated according to priority. At 1710, power may be allocated in order of higher priority to lower priority to a physical uplink control channel (PUCCH), a physical uplink shared channel (PUSCH) with uplink control information (UCI), and a PUSCH without UCI. At 1712, power may be allocated with a higher priority to channels for a Master Evolved Node B (MeNB) and with a lower priority to channels for a Secondary eNB (SeNB).

At 1714, transmit power may be allocated in order of higher priority to lower priority for MeNB PUCCH, SeNB PUCCH, MeNB PUCCH with UCI, SeNB PUCCH with UCI, all PUSCHs without UCI. At 1716, transmit power may be allocated with a higher priority to a physical uplink shared channel (PUSCH) that carries traffic with a higher grade of service and with a lower priority to a PUSCH with a lower grade of service.

According to certain aspects, applying the PHR and power sharing techniques described above may avoid a dual-connectivity UE from sending transmissions that exceed the UEs maximum transmit power capability. The techniques may also exploit unused power designated for transmissions to a base station which may increase efficiency.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Figure 17A:
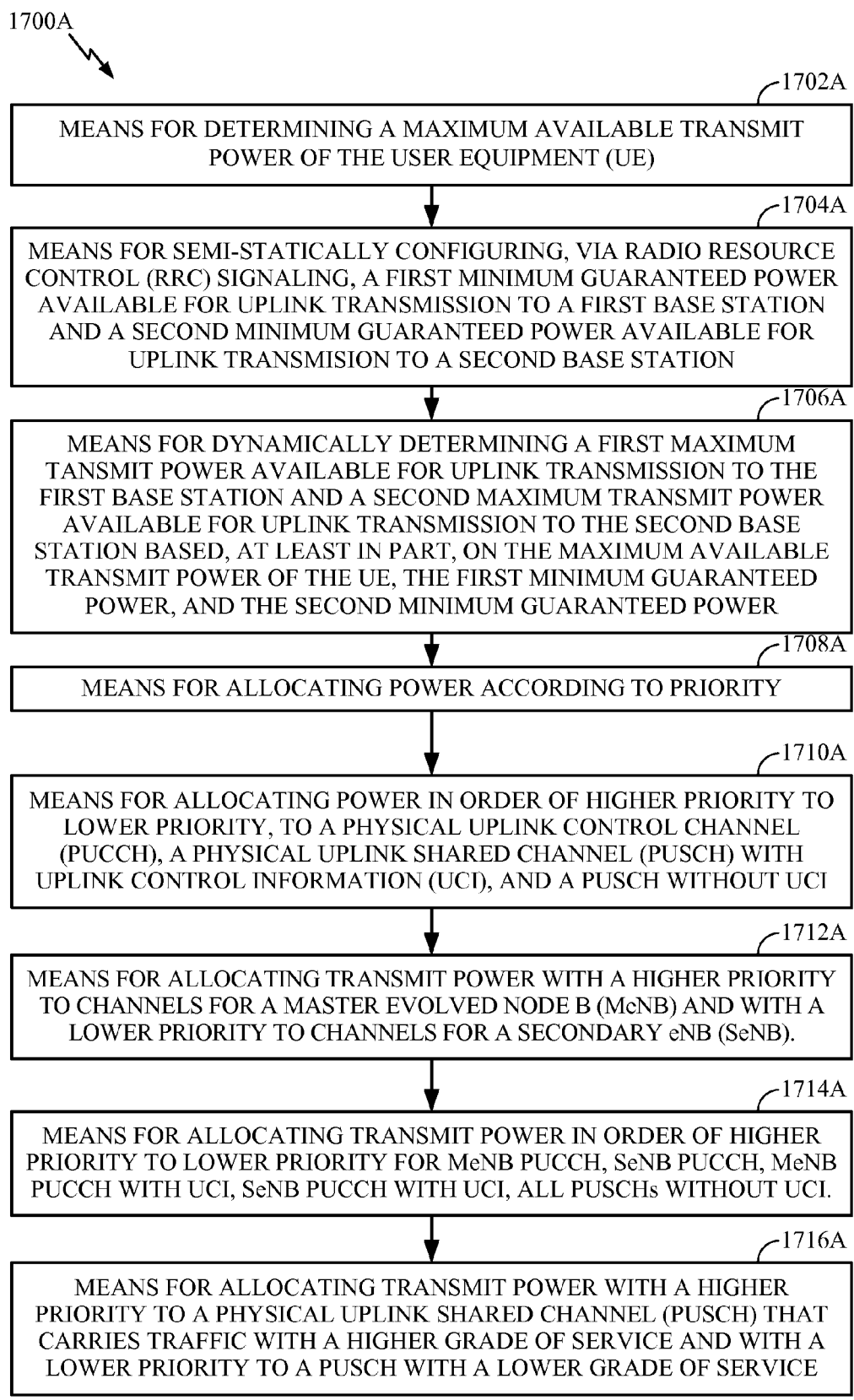
FIG. 17A illustrates example means capable of performing the operations shown in FIG. 17.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1700 illustrated in FIG. 17 correspond to means 1700A illustrated in FIG. 17A.

For example, means for receiving and means for sending may be a demodulator 432 and/or an antenna(s) 434 of the eNB 110 illustrated in FIG. 4 or the demodulator 454 and/or antenna(s) 452 of UE 120 illustrated in FIG. 4. Means for determining and means for including may comprise a processing system, which may include one or more processors, such as the TX MIMO processor 430, the transmit processor 420, the receive processor 438 and/or the controller/processor 440 of the eNB 110 illustrated in FIG. 4 or the TX MIMO processor 466, the receive processor 458, the transmit processor 464, and/or the controller/processor 480 of the UE 120 illustrated in FIG. 4.

According to certain aspects, such means may be implemented by processing systems configured to perform the corresponding functions by implementing various algorithms (e.g., in hardware or by executing software instructions) described above. For example, an algorithm for determining a maximum available transmit power of the UE, an algorithm for semi-statically configuring a first minimum guaranteed power available for uplink transmission to a first base station and a second minimum guaranteed power available for uplink transmission to a second base station, and an algorithm for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    determining a maximum available transmit power of the UE;
    semi-statically configuring a first minimum guaranteed power available for uplink transmission to a first base station and a second minimum guaranteed power available for uplink transmission to a second base station; and
    dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power, wherein dynamically determining the first maximum transmit power and the second maximum transmit power comprises:
    determining an amount of the first minimum guaranteed power that is unused for uplink transmission to the first base station, and
    including at least a portion of the unused amount when determining the second maximum transmit power available for uplink transmission to the second base station.

2. The method of claim 1, wherein the semi-static configuring is via radio resource control (RRC) signaling.

3. The method of claim 1, wherein the unused amount comprises an amount of the first minimum guaranteed power that is unused for transmission to the first base station on all uplink channels to be transmitted to the first base station.

4. The method of claim 1, wherein the first base station and the second base station operate asynchronously, and wherein dynamically determining the first maximum transmit power and the second maximum transmit power comprises:
    determining a first amount of the first minimum guaranteed power that is unused for uplink transmission to the first base station during a first transmission time interval (TTI);
    determining a second amount of the first minimum guaranteed power that is unused for uplink transmission to the first base station during a second TTI overlapping the first TTI; and
    including at least a portion of the smaller of the first unused amount or the second unused amount when determining the second maximum transmit power.

5. The method of claim 1, wherein the first base station comprises a Master Evolved Node B (MeNB) or a Secondary eNB (SeNB) and the second base station comprises the other one of a MeNB or a SeNB.

6. The method of claim 1, wherein the semi-static configuring is based on a prioritization.

7. The method of claim 6, wherein the prioritization comprises allocating transmit power, in order of higher priority to lower priority, to: a physical uplink control channel (PUCCH), a physical uplink shared channel (PUSCH) with uplink control information (UCI), and a PUSCH without UCI.

8. The method of claim 6, wherein the prioritization comprises allocating transmit power with a higher priority to channels for a Master Evolved Node B (MeNB) and with a lower priority to corresponding channels for a Secondary eNB (SeNB).

9. The method of claim 6, wherein the prioritization comprises allocating transmit power, in order of higher priority to lower priority, to: a physical uplink control channel (PUCCH) for a Master Evolved Node B (MeNB), a PUCCH for a Secondary eNB (SeNB), a physical uplink shared channel (PUSCH) with uplink control information (UCI) for a MeNB, a PUSCH with UCI for a SeNB, and a PUSCH without UCI.

10. The method of claim 6, wherein the prioritization comprises allocating transmit power with a higher priority to a physical uplink shared channel (PUSCH) that carries traffic with a higher grade of service and with a lower priority to a PUSCH that carries traffic with a lower grade of service.

11. The method of claim 6, wherein the prioritization comprises uniformly distributing power for physical uplink shared channel (PUSCH) transmissions to the first base station and the second base station.

12. The method of claim 1, further comprising:
    sending a power headroom report (PHR) to at least one of the first base station or the second base station indicating at least one of the first maximum transmit power or the second maximum transmit power.

13. An apparatus for wireless communications, comprising:
    at least one processor configured to:
        determine a maximum available transmit power of the apparatus,
        semi-statically configure a first minimum guaranteed power available for uplink transmission to a first base station and a second minimum guaranteed power available for uplink transmission to a second base station, and
        dynamically determine a first maximum transmit power available for uplink transmission to the first base station and a second maximum transmit power available for uplink transmission to the second base station based, at least in part, on the maximum available transmit power of the apparatus, the first minimum guaranteed power, and the second minimum guaranteed power, wherein dynamically determining the first maximum transmit power and the second maximum transmit power comprises:
            determining an amount of the first minimum guaranteed power that is unused for uplink transmission to the first base station, and
            including at least a portion of the unused amount when determining the second maximum transmit power available for uplink transmission to the second base station; and
    a memory coupled with the at least one processor.

14. The apparatus of claim 13, wherein the semi-static configuring is via radio resource control (RRC) signaling.

15. The apparatus of claim 13, wherein the unused amount comprises an amount of the first minimum guaranteed power that is unused for transmission to the first base station on all uplink channels to be transmitted to the first base station.

16. The apparatus of claim 13, wherein the first base station and the second base station operate asynchronously, and wherein dynamically determining the first maximum transmit power and the second maximum transmit power comprises:
    determining a first amount of the first minimum guaranteed power that is unused for uplink transmission to the first base station during a first transmission time interval (TTI);
    determining a second amount of the first minimum guaranteed power that is unused for uplink transmission to the first base station during a second TTI overlapping the first TTI; and
    including at least a portion of the smaller of the first unused amount or the second unused amount when determining the second maximum transmit power.

17. The apparatus of claim 13, wherein the first base station comprises a Master Evolved Node B (MeNB) or a Secondary eNB (SeNB) and the second base station comprises the other one of a MeNB or a SeNB.

18. The apparatus of claim 13, wherein the semi-static configuring is based on a prioritization.

19. The apparatus of claim 18, wherein the prioritization comprises allocating transmit power, in order of higher priority to lower priority, to: a physical uplink control channel (PUCCH), a physical uplink shared channel (PUSCH) with uplink control information (UCI), and a PUSCH without UCI.

20. The apparatus of claim 18, wherein the prioritization comprises allocating transmit power with a higher priority to channels for a Master Evolved Node B (MeNB) and with a lower priority to corresponding channels for a Secondary eNB (SeNB).

21. The apparatus of claim 18, wherein the prioritization comprises allocating transmit power, in order of higher priority to lower priority, to: a physical uplink control channel (PUCCH) for a Master Evolved Node B (MeNB), a PUCCH for a Secondary eNB (SeNB), a physical uplink shared channel (PUSCH) with uplink control information (UCI) for a MeNB, a PUSCH with UCI for a SeNB, and a PUSCH without UCI.

22. The apparatus of claim 18, wherein the prioritization comprises allocating transmit power with a higher priority to a physical uplink shared channel (PUSCH) that carries traffic with a higher grade of service and with a lower priority to a PUSCH that carries traffic with a lower grade of service.

23. The apparatus of claim 18, wherein the prioritization comprises uniformly distributing power for physical uplink shared channel (PUSCH) transmissions to the first base station and the second base station.

24. The apparatus of claim 13, further comprising:
sending a power headroom report (PHR) to at least one of the first base station or the second base station indicating at least one of the first maximum transmit power or the second maximum transmit power.

25. An apparatus for wireless communication by a user equipment (UE), comprising:
means for determining a maximum available transmit power of the UE;
means for semi-statically configuring a first minimum guaranteed power available for uplink transmission to a first base station and a second minimum guaranteed power available for uplink transmission to a second base station; and
means for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power, wherein means for dynamically determining the first maximum transmit power and the second maximum transmit power comprises:
means for determining an amount of the first minimum guaranteed power that is unused for uplink transmission to the first base station, and
means for including at least a portion of the unused amount when determining the second maximum transmit power available for uplink transmission to the second base station.

26. A non-transitory computer readable medium having computer executable code stored there, the computer executable code comprising:
code for determining a maximum available transmit power of the UE;
code for semi-statically configuring a first minimum guaranteed power available for uplink transmission to a first base station and a second minimum guaranteed power available for uplink transmission to a second base station; and
code for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power, wherein code for dynamically determining the first maximum transmit power and the second maximum transmit power comprises:
code for determining an amount of the first minimum guaranteed power that is unused for uplink transmission to the first base station, and
code for including at least a portion of the unused amount when determining the second maximum transmit power available for uplink transmission to the second base station.

* * * * *